Figure 1:
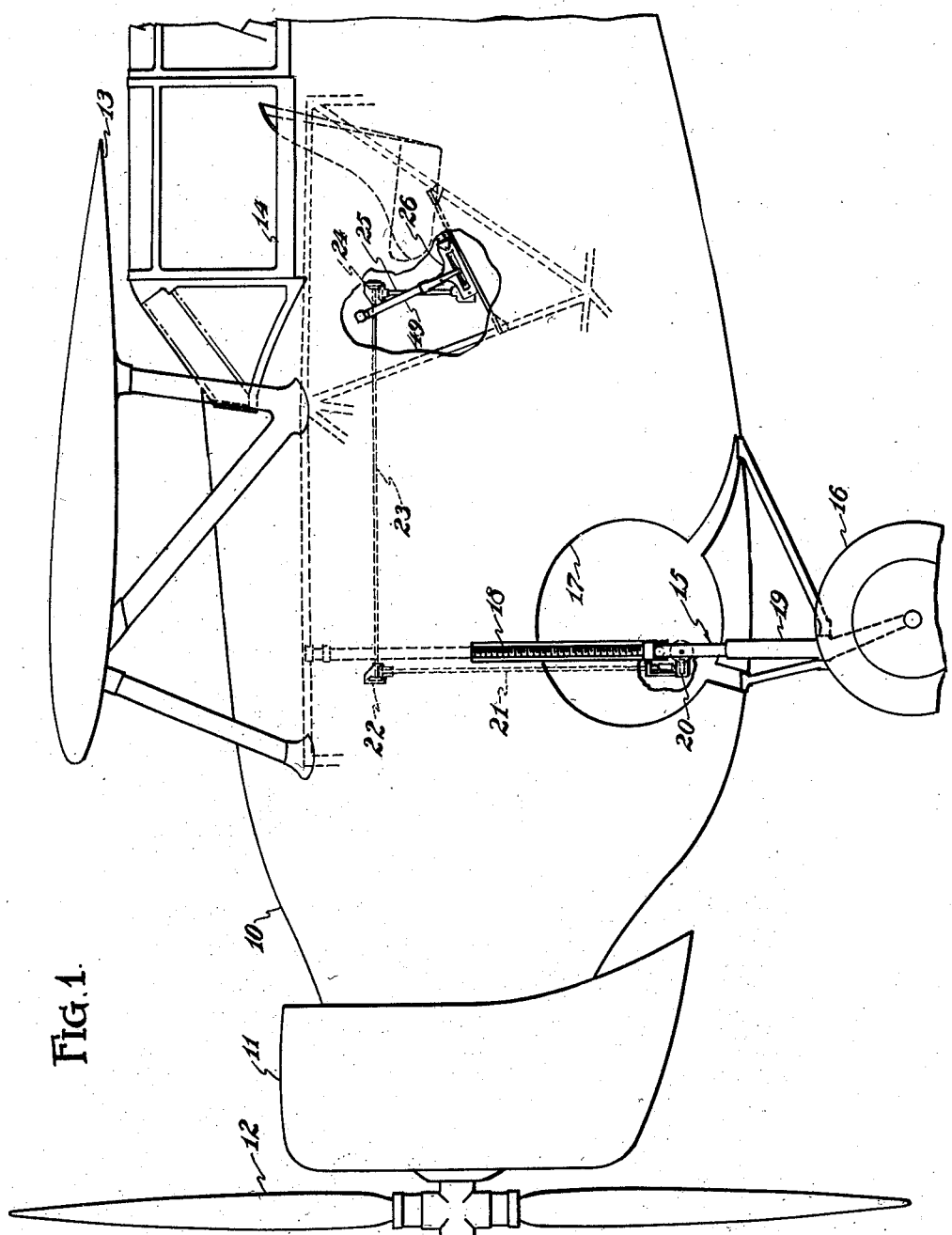

Nov. 19, 1935.    C. E. HATHORN    2,021,307
RETRACTABLE LANDING GEAR OPERATING MEANS
Filed Jan. 23, 1934    2 Sheets-Sheet 1

INVENTOR.
CHARLES E. HATHORN
BY
ATTORNEYS.

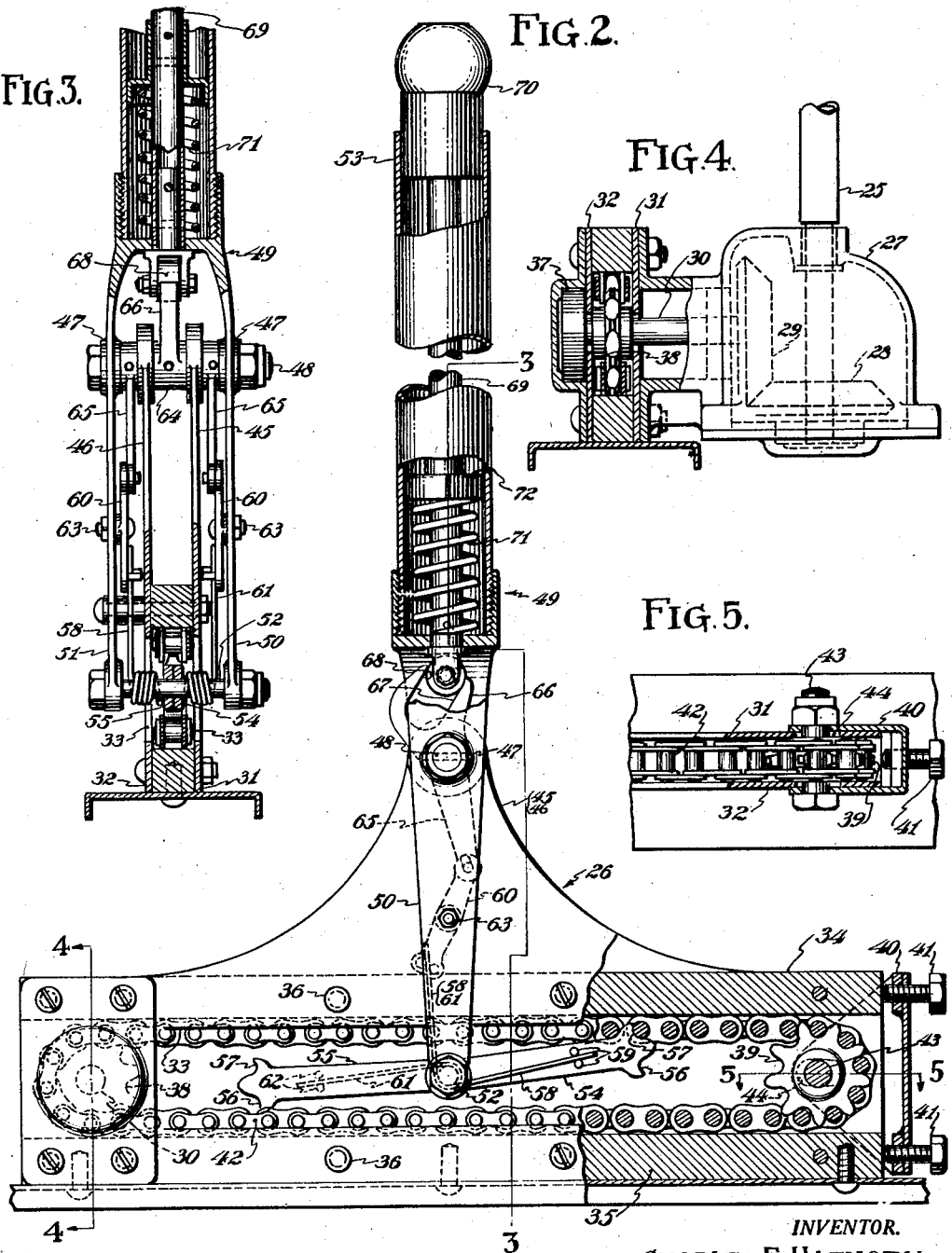

Patented Nov. 19, 1935

2,021,307

UNITED STATES PATENT OFFICE 2,021,307

RETRACTABLE LANDING GEAR OPERATING MEANS

Charles E. Hathorn, Kenmore, N. Y., assignor to Curtiss Aeroplane & Motor Company, Inc., a corporation of New York Application January 23, 1934, Serial No. 707,876

1 Claim. (Cl. 74—166)

This invention relates to retractable landing gears for aircraft, and is particularly concerned with improvements in operating mechanisms for extending and retracting such retractable landing gears. The operating mechanisms for retractable landing gears have taken numerous forms, including electric motors, direct connections from the aircraft power plant to the mechanism, hydraulic devices and hand operated devices. In the latter form of operating mechanism, a crank has usually been provided. Since the energy required to retract a landing gear is of considerable magnitude, and since it is necessary to accomplish retraction or extension in a minimum length of time, the crank mechanism is objectionable in that, to be adequate, the crank arm must be of considerable length, which takes up an excessive amount of space in the cockpit in order to provide adequate room for its movement. The crank also has an objection in that it has "dead centers" which are difficult to pass when the pilot or aircraft crew member is turning the crank. Usually, the operator of the mechanism is seated in the cockpit and operates the cranking mechanism with his right hand. In such position, the greatest force which he can apply is either pushing or pulling in a fore and aft direction. He is unable to exert a large amount of force when lifting or pressing down on the crank at its extreme fore and aft positions.

It therefore becomes apparent that an oscillating or reciprocating lever movable forwardly and rearwardly would be highly desirable, since the lever arm may be quite long without taking up an undue amount of space, and since the operator can exert a maximum amount of work on the lever. Further, mechanism should be provided so that both the forward and rearward movement of the lever accomplishes a useful result in effecting either extension or retraction of the landing gear as desired.

It is an object, then, of this invention, to provide an oscillating lever mechanism organized to extend or retract an aircraft landing gear.

A further object is to provide in the mechanism, a large mechanical advantage whereby the operator may oscilllate the lever rapidly and with a relatively moderate degree of force to gradually but quickly accomplish full extension or retraction of the landing gear.

Still another object is to provide means selectively operable whereby the mechanism may be connected to extend the landing gear or, on the other hand, connected to retract the landing gear.

It is a further object of the invention to provide a mechanism which allows the effort applied to both forward and rearward motion of the lever to be converted to useful work in extending or retracting the landing gear.

Still another object of the invention is to provide a mechanism for converting reciprocating or oscillating motion to unidirectional rotary motion.

Generally, a rotary member is provided in a retractable landing gear, rotation of which in one or the other direction either retracts or extends the landing gear. To such a rotary member, a sprocket is attached and a second idler sprocket is arranged in spaced relation thereto. Over the sprockets, a chain is passed, providing substantially straight upper and lower chain runs between the sprockets. Suitable tracks are arranged adjacent the straight chain runs for guidance of the chain. Intermediate the two sprockets and preferably spaced above them, a lever is pivoted, the upper end of the lever having a handle for manual oscillation thereof. The bottom of the lever extends to a point between the runs of the chain, and to the bottom, a pair of pawls are pivoted, the pawls being resiliently urged in a clockwise or counter-clockwise direction, one pawl being adapted to drivably engage the upper run of the chain, and the other pawl being adapted to drivably engage the lower run of the chain. Means are provided for selectively reversing the engagement of the pawls with the opposite chain runs. By the construction provided, oscillation of the lever about its pivot in one direction will cause one pawl to engage the upper chain run and to thereby rotate the sprocket. Upon reverse oscillation of the lever the other pawl engages the lower chain run and continues to rotate the sprocket in the same direction. By operating the selective means, the sprocket may be caused to rotate in the opposite direction as, for instance, for extending the landing gear, the first direction of rotation having been arranged for retraction of the landing gear.

For a clearer understanding of the details of the invention, reference may be made to the following specification and to the drawings, in which:

Fig. 1 is a side elevation of an airplane, partly broken away, showing certain of the landing gear mechanism and showing the operating means therefor;

Fig. 2 is a side elevation, partly in section, showing the landing gear operating means; and Figs. 3, 4, and 5 are sections on the lines 3—3, 4—4, and 5—5 of Fig. 2, respectively.

The airplane 10 having the usual forwardly located cowled engine 11 and propeller 12, and having a wing 13 and cockpit 14, is provided with a retractable landing gear 15. A wheel 16 of the landing gear is organized to be retracted within and extended from an opening 17 formed in the side of the fuselage 10, and a lead screw 18, within the fuselage, may be turned to draw the struts 19 with the wheel 16, upwardly and downwardly in a manner well known in the art. The lead screw, at its lower end, is provided with a gear box 20, from which a drive shaft 21 extends upwardly to a second gear box 22. From the gear box 22, a drive shaft 23 extends rearwardly in right angled relation to the shaft 21, to a gear box 24. Thence, a drive shaft 25 extends downwardly to the landing gear operating mechanism, inclusively indicated as 26.

Now referring to Figs. 2 to 5, inclusive, the shaft 25 leads into a housing 27 and terminates in a bevel gear 28, this gear meshing with a bevel gear 29 having a short shaft 30 passing to the mechanism 26. The mechanism includes a pair of spaced side plates 31 and 32, each having a longitudinal slot 33 formed therein. An upper rail 34 and a lower rail 35 serve to separate the plates 31 and 32, these elements being rigidly attached to each other by screws 36. A bearing 37 is provided at one end of the plates 31 and 32 within which the shaft 30 is journaled, the shaft 30 carrying a sprocket 38 between the plates 31 and 32 and between the rails 34 and 35. A similar sprocket 39 is carried at the opposite end of the plate and rail assembly, this being journaled for idling, and being mounted in a fitting 40, said fitting having adjusting screws 41 which serve to adjust the center distance between the sprockets 38 and 39. Over said sprockets, a chain 42 is run, the portions of the chain between the sprockets thereby providing an upper run and a lower run, the chain of the upper run being adapted to bear against the inner face of the rail 34, and the chain of the lower run being adapted to bear against the inner face of the rail 35. The chain is laterally guided by the plates 31 and 32. It will be apparent thus far, that translation of the upper run of the chain 42 to the right, for instance, or translation of the lower run of the chain 42 to the left, will cause rotation of both sprockets, 38 and 39, in a clockwise direction. Reverse movement of the chain will cause rotation of the sprockets 38 and 39 in a counter-clockwise direction. Such rotation of the sprocket 38 is transmitted through the several shafts and gear boxes 20 to 25, inclusive, to the lead screw 18, thereby effecting either extension or retraction of the landing gear. In connection with the adjusting screws 41 for moving the sprocket 39 laterally, this device serves to take up slack in the chain after wear thereof. As the fitting 40 embraces the plates 31 and 32, the shaft 43 of the sprocket 39 passes through elongated slots 44 in the plates 31 and 32, thereby permitting translation and guidance of the shaft 43.

The plates 31 and 32 are extended upwardly as at 45 and 46 to provide bearings 47 for receiving a pin 48. On this pin, a bifurcated lever 49 is carried for oscillation, the lower ends of the bifurcations 50 and 51, respectively, carrying a cross pin 52 which passes through the slots 33 in the plates 31 and 32, and between the upper and lower runs of the chain 42. The lever 49 extends above the pin 48 to terminate in a handle portion 53. To the cross pin 52 at the lower end of the lever, a pair of substantially similar oppositely extending pawls 54 and 55 are individually pivoted, the outer end of each pawl having opposed teeth 56 and 57. The teeth 56 and 57 are so shaped as to engage between the rollers of the chain 42, each of the teeth 56 being on the lower side of their respective pawls to engage the lower run of the chain 42, and each of the teeth 57 being formed on the upper side of the pawls to engage the upper run of the chain 42. A wire spring 58 engages between a pair of dowels 59 on the pawl 54, and extends around the cross pin 52 and upwardly to a link 60, this spring tending to resiliently urge the pawl 54 upwardly into engagement with the upper run of the chain. A spring 61 is held between dowels 62 on the pawl 55, passing around the cross pin 52 and upwardly to a second link 60. This spring is organized to resiliently urge the pawl 55 into contact with the lower run of the chain 42. The links 60, in their normal position, will hold the springs 58 and 61 in the manner just described, but said links may be turned about their pivot points 63, in a counter-clockwise direction from that shown in Fig. 2, to reverse the tension on said springs, thereby urging the pawl 54 into contact with the lower run of the chain 42, and urging the pawl 55 into contact with the upper run of the chain 42. The pivot points 63 for the links 60 are carried by the bifurcated arms 50 and 51 of the lever 49. Means for turning the links 60 include a member 64 freely pivoted in the bearings 47, said member having a pair of arms 65 revoluble therewith, extending downwardly to contact at their ends with the upper ends of the links 60. Centrally of the member 64, a cam arm 66 extends upwardly and is provided with a slanted slot 67, against which a roller 68 may engage. The roller is carried by a plunger 69 which may be pressed downwardly by means of a knob 70 located on top thereof and above the handle portion 53 of the lever 49. A spring 71 abutting respectively against a portion of the lever 49 and against a plug 72 carried by the plunger 69, serves to normally hold the knob 70, and the roller 68, in an extreme upper position. Such a position of the roller 68 permits the links 60 to assume their extreme clockwise position. Depression of the knob 70, with the roller 68, acts upon the slanting surface 67 of the cam arm 66, thereby turning the links 60 in a counter-clockwise direction to effect reversal of the pawls as previously described.

The operation of the device as a whole may be summarized as follows. Assuming that, when the knob 70 is in its upward position, the mechanism is set for extension of the landing gear, oscillation of the lever 49 will cause the pawls 54 and 55 to alternately engage the chain 42 and to cause rotation of the sprocket 38 in a clockwise direction, thereby extending the landing gear. Since extension of the landing gear should be effected in a shorter time than retraction thereof, the possible additional confusion of pressing the knob 70 is eliminated—the pilot may clutch the lever 49 and immediately oscillate it without thinking about anything else. When it is desired to retract the landing gear, which may be accomplished more or less at leisure, the pilot grasps the handle 53, depresses the knob 70, and oscillates the hand lever as before. Thus, retraction of the landing gear is effected, since depression of the knob has shifted the pawls 54 and 55 so that counterclockwise rotation of the sprockets 38 with the associated driving mechanism takes place.

While I have described my invention in detail in its present preferred embodiment, it will be obvious to those skilled in the art, after understanding my invention, that various changes and modifications may be made therein without departing from the spirit or scope thereof. I aim in the appended claim to cover all such modifications and changes.

What is claimed is:

In an operating mechanism, a support, a lever pivoted thereto for to-and-fro movement, a pair of oppositely extending pawls pivoted to said lever, a pair of spaced sprockets journaled in said support, one said sprocket being drivably connected with a mechanism to be driven, a chain running over said sprockets, said pawls being alternately drivably engageable with the opposite runs of said chain as said member is moved to and fro for effecting unidirectional rotation of said sprockets, and means for shifting the driving engagement of each said pawl to the opposite chain run for selectively reversing the rotational direction of said sprockets as said lever is moved to-and-fro.

CHARLES E. HATHORN.